(12) United States Patent
Wanibe

(10) Patent No.: US 8,079,657 B2
(45) Date of Patent: Dec. 20, 2011

(54) LIQUID SENSING DEVICE AND LIQUID CONTAINER INCLUDING THE SAME

(75) Inventor: Akihisa Wanibe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 269 days.

(21) Appl. No.: 12/402,269

(22) Filed: Mar. 11, 2009

(65) Prior Publication Data

US 2009/0229376 A1    Sep. 17, 2009

(30) Foreign Application Priority Data

Mar. 12, 2008  (JP) ................................ 2008-063297
Feb. 9, 2009   (JP) ................................ 2009-027264

(51) Int. Cl.
*B41J 2/195* (2006.01)
*B41J 2/175* (2006.01)

(52) U.S. Cl. ............................................. 347/7; 347/86
(58) Field of Classification Search ................ 347/7, 85, 347/86
See application file for complete search history.

(56) References Cited

U.S. PATENT DOCUMENTS

2005/0243110 A1* 11/2005 Takahashi et al. ................. 347/7
2006/0152539 A1*  7/2006 Zhang et al. ....................... 347/7
2006/0227190 A1* 10/2006 Ishizawa et al. ................. 347/86

FOREIGN PATENT DOCUMENTS

| JP | 2001-146030 A | 5/2001 |
| JP | 2006-281550 A | 10/2006 |
| JP | 2007-15408 A | 1/2007 |

* cited by examiner

*Primary Examiner* — Stephen Meier
*Assistant Examiner* — Tracey McMillion

(57) ABSTRACT

A liquid sensing device is for a liquid consuming system in which air is introduced from the upstream end in association with consumption of liquid at the downstream end. The liquid sensing device includes a sensor positioning member that defines a sensing flow channel including an inlet hole at the upstream end and a first outlet hole at the downstream end, a sensor positioned on the outside face of the sensor positioning member at a location facing the sensing flow channel as to sense whether liquid is present in the sensing flow channel, and a sensor positioning member mounting portion that mounts the sensor positioning member. The sensor positioning member mounting portion includes a downstream buffer chamber-defining portion including an aperture communicating with the first outlet hole and that in conjunction with the sensor positioning member defines a downstream buffer chamber adapted to receive the liquid and the air exiting from the first outlet hole, and a second outlet hole communicating with the downstream buffer chamber and through which the liquid and the air from the downstream buffer chamber exit. Contours of the downstream buffer chamber are defined such that the liquid and the air received from the first outlet hole flow to the second outlet hole in nonlinear fashion along a wall face of the downstream buffer chamber.

15 Claims, 12 Drawing Sheets

# LIQUID SENSING DEVICE AND LIQUID CONTAINER INCLUDING THE SAME

CROSS REFERENCE TO RELATED APPLICATIONS

This application relates to and claims priority from Japanese Patent Application No. 2008-063297, filed on Mar. 12, 2008, and Japanese Patent Application No. 2009-027264, filed on Feb. 9, 2009, the entire disclosure of which is incorporated by reference.

BACKGROUND

1. Technical Field

The present invention relates to a liquid sensing device to sense the level of remaining liquid (ink) particularly in a liquid consuming system such as an inkjet recording device and a liquid container provided to such a device.

2. Description of the Related Art

One representative example of a conventional liquid consuming device is an inkjet recording device equipped with an inkjet recording head for printing images. Examples of other liquid jetting devices are devices equipped with a coloring matter jetting head used to manufacture color filters in liquid crystal displays; devices equipped with an electrode material (electrode paste) jetting head used to produce electrodes in organic EL displays, field emission displays (FED) or the like; devices equipped with a bioorganic substance jetting head used in biochip manufacture; and devices equipped with a specimen jetting head as a precision pipette.

In an inkjet recording device, a typical example of such a liquid consuming device, an inkjet recording head that is furnished with pressure generating means adapted to pressurize a pressure generating chamber and with nozzle apertures for ejecting the pressurized ink as ink drops is installed on a carriage. The design makes possible intermittent printing by continuing to supply ink inside an ink storage receptacle to the recording head via a flow channel. The ink storage receptacle is designed as a detachable cartridge, enabling the user to easily replace it when the ink has been consumed, for example.

Past methods for monitoring ink consumption in an ink cartridge include methods involving monitoring through calculation of ink consumption by software adapted to cumulate the number of ink drops ejected by the head or the amount of ink suctioned by maintenance operations; or methods involving monitoring of the point in time that a prescribed amount of ink has actually been consumed, by installing electrodes for sensing the liquid level in the ink cartridge.

However, methods involving monitoring through software calculation of ink consumption based on cumulative number of ink drops ejected by the head or amount of ink has drawbacks such as the following. There is some variability among heads in the weight of ejected ink drops. While such variability in weight of ejected ink drops has no discernible effect on print quality, in consideration of cumulative errors in ink consumption due to such variations, ink cartridges are typically filled with ink in amounts that provide a margin for this. A consequent problem is that, depending on the individual cartridge, there will be an excess of ink in an amount equivalent to this margin.

On the other hand, methods involving monitoring the point in time that the ink has been consumed with electrodes affords highly reliable monitoring of remaining ink level, since actual ink level can be detected. However, drawbacks are that since the ability to detect the ink level depends on the conductivity of the ink, the types of ink that can be detected is limited; and that a complicated sealing structure will be needed for the electrodes. Additionally, because the materials for the electrodes are typically noble metals (which have good conductivity and high corrosion resistance), ink cartridge production costs will be higher. Also, because two electrodes must be installed, there are more manufacturing steps, and production costs will be higher as a result.

In Patent Citation 1, a piezoelectric device (herein termed a "sensor unit") is disclosed as a device adapted to overcome the above problems. This sensor unit monitors the amount of remaining ink in the ink cartridge, by utilizing the fact that the resonance frequency of a residual vibration signal produced by residual vibration (free vibration) of an oscillator plate subsequent to forced oscillation will vary depending on whether or not ink is present in a cavity facing the oscillator plate on which the piezoelectric element has been stacked.

In Patent Citation 2 there is disclosed a liquid sensing device equipped with a sensor chip that has a sensor cavity (232) for receiving the liquid targeted for sensing and that includes a piezoelectric element for imparting oscillation at least to this sensor cavity (232); a sensor base (220) that is joined to the sensor cavity (232) side; a first hole (222) provided in the sensor base (220) and adapted to conduct the liquid into the sensor cavity (232); a second hole (223) provided in the sensor base (220) and adapted to drain liquid from the sensor cavity (232); a downstream buffer chamber (123) for retaining liquid drained from the second hole (223); and an outlet (125) for the liquid from the downstream buffer chamber (123).

[Patent Citation 1] Japanese Unexamined Patent Publication 2001 13'16030 2001-146030
[Patent Citation 2] Japanese Unexamined Patent Publication 2006-281550

The basic principle of sensing disclosed in Patent Citation 1 can be fulfilled with the technology of Patent Citation 2; and where there is a sufficient amount of liquid in sensing target (e.g. a liquid container), specifically, where the sensor cavity (232), the first hole (222), the second hole (223), and the downstream buffer chamber (123) that together constitute the fluid flow channel are filled with liquid, it will be possible to accurately sense that "sufficient liquid is present."

However, with the technology of Patent Citation 2, in the event that for example there is only a small amount of remaining liquid in the liquid container, in some instances it may not be possible to accurately detect this fact (i.e. the fact that the remaining liquid level is less than a prescribed level). Where the remaining liquid level has dropped to less than a prescribed level, under normal circumstances air will enter (and liquid will disappear from) the sensor cavity (232), the first hole (222), the second hole (223), and the downstream buffer chamber (123) that constitute the fluid flow channel, and the sensor chip should be able to detect this fact.

However, in the prior art, in some instances a considerable of liquid will remain in the buffer chamber despite the remaining liquid level in the liquid container having dropped to less than the prescribed level, for example. Since the buffer chamber has a large liquid storage capacity, the extent of remaining liquid in the buffer chamber will have an appreciable effect on whether or not liquid is sensed. If a large amount of liquid is present in the buffer chamber, the sensor chip will sense that "sufficient liquid is still present" in the liquid container. On the other hand, if there is too little liquid in the liquid container, and as a result the liquid in the buffer chamber is less than the prescribed level, the sensor chip will sense that "the remaining liquid level is less than the prescribed level" in the liquid container.

Since in the prior art one encounters instances in which a considerable of liquid will remain in the buffer chamber despite the remaining liquid level in the liquid container having dropped to less than the prescribed level for example, in such instances it may be sensed in error that "sufficient liquid is still present" in the liquid container.

SUMMARY

It is accordingly one object of the present invention to provide a liquid sensing device furnished with a construction able to minimize sensing error during sensing of a liquid; and a liquid container employing the same.

The liquid sensing device according to a first mode of the present invention is furnished with a sensor chip that has a sensor cavity for receiving a liquid targeted for sensing and that includes a piezoelectric element for imparting oscillation to the sensor cavity; a sensor base that is joined to the sensor cavity side of the sensor chip; a first hole provided in the sensor base and adapted to conduct the liquid into the sensor cavity; a second hole provided in the sensor base and adapted to drain the liquid from the sensor cavity; a downstream buffer chamber for retaining liquid drained from the second hole; an outlet for liquid provided to the downstream buffer chamber; and a bypass circuit-defining part that defines a bypass circuit for bypassing the flow channel inside the downstream buffer chamber leading from the second hole towards the outlet.

When the remaining level of a liquid in a sensing target (e.g. a liquid container) falls below a prescribed value, an upstream buffer chamber that communicates with the first hole side will become occupied by air instead of liquid. Moreover, when the interior of the sensor cavity becomes occupied by air instead of liquid, the liquid sensing device will be able to sense that the remaining liquid level has dropped.

At this point, if the downstream buffer chamber lacked the bypass circuit defined by the bypass circuit-defining part, there would arise a phenomenon whereby, with liquid still remaining in the large-capacity downstream buffer chamber, only a fine froth of bubbles will pass in linear fashion along the shortest distance from the second hole of the sensor base to the outlet of the downstream buffer chamber.

Because only this fine froth of bubbles passes through while the liquid remains behind, under conditions that in normal circumstances would predicate that a drop in remaining liquid should be sensed, in some instances the sensor cavity will remain filled with liquid, and the drop in the remaining liquid will not be sensed.

According to this first mode of the present invention, because a bypass circuit has been formed in the downstream buffer chamber, the fine froth of bubbles will be inhibited from traveling in linear fashion towards the outlet of the downstream buffer chamber. Specifically, the bypass circuit-defining part has a first wall for inhibiting flow in a straight-line path along the shortest distance from the second hole to the outlet of the downstream buffer chamber. According to this first mode of the present invention, air bubbles will not form a fine froth, but will instead act in such a way that liquid remaining in the downstream buffer chamber is pushed along towards the outlet of the downstream buffer chamber by the air bubbles. For this reason, according to this liquid sensing device, when the level of liquid in the sensing target (e.g. a liquid container) drops below a prescribed value and air has become comingled in the downstream buffer chamber as a result, the quantity of liquid remaining in the downstream buffer chamber will be conducted towards the outlet in a reliable manner so that the sensor cavity fills with air, thus minimizing sensor error during liquid sensing.

In another possible mode of the present invention, the bypass circuit-defining part has a second wall that defines the bypass circuit in the substantially opposite direction from the direction leading from the second hole to the outlet of the downstream buffer chamber.

The first and second walls define a generally "L" shape in plan view. Thus, the aforementioned fine froth of bubbles can be prevented in a reliable manner from traveling towards the outlet along the shortest distance.

In another possible mode of the present invention, the device further includes an upstream buffer chamber for retaining liquid to be conducted to the first hole, and a partition wall that partitions the upstream buffer chamber from the downstream buffer chamber; the upstream buffer chamber and the downstream buffer chamber have flow channel walls at locations facing the sensor base; and the partition wall and the bypass circuit-defining part are constituted by ribs integrally formed with the flow channel walls and extending towards the sensor base.

With this arrangement, the partition wall that partitions the upstream from the downstream buffer chamber can be defined, and a bypass circuit partitioned off from the lower buffer chamber can be defined, by ribs that rise above the flow channel walls.

In another possible mode of the present invention, the partition wall does not contact the sensor base; and rib height from the flow channel wall to the distal edge of the bypass circuit-defining part is equal to or shorter than the rib height from the flow channel wall to the distal edge of the dividing wall. The partition wall and the bypass circuit-defining part can thereby be arranged such that they do not contact the sensor base. By so doing, oscillation of the sensor base will not be impaired by the partition wall or the bypass circuit-defining part. Oscillation of the sensor chip gives rise to oscillation of the sensor base, and oscillation of the sensor base gives rise to oscillation of the sensor chip. Consequently, by avoiding impaired oscillation of the sensor base by the partition wall or the bypass circuit-defining part, accuracy of the sensor chip in sensing the presence or absence of liquid can be improved.

In another possible mode of the present invention, flow channel resistance in the gap between the sensor base and the bypass circuit-defining part is higher than flow channel resistance in the bypass circuit.

With this arrangement, the gap between the sensor base and the distal edge of the rib that constitutes the bypass circuit-defining part does not constitute a flow channel, and in the lower buffer chamber only the bypass circuit functions as a flow channel.

Another possible mode of the present invention has a main case in which the upper buffer chamber and the lower buffer chamber are formed; and the main case constitutes part of the receptacle for storing the liquid.

That is, the present invention may have a main case provided as a stand-alone liquid sensing device; or the main case of the liquid sensing device may constitute part of the receptacle for storing the liquid.

Where the main case of the liquid sensing device is constituted as an integral unit with the liquid container, oscillation of the sensor base will be absorbed by the liquid container, so there will be an appreciable need for the partition wall and the bypass circuit-defining part to be positioned in a state of non-contact with the sensor base. There will be no need for a seal between the liquid sensing device and the liquid container, and since parts such as sealing rubber and springs can be dispensed with, there will fewer parts and better ease of assembly.

The invention in another mode provides a liquid container furnished with the aforementioned liquid sensing device.

Another aspect of this invention provides a liquid sensing device for use in a liquid consuming system in which air is introduced from an upstream end of the system in association with consumption of liquid at an downstream end of the system. The liquid sensing device according to this aspect comprises a sensor positioning member; a sensor; and a sensor positioning member mounting portion that mounts the sensor positioning member. The sensor positioning member defines a sensing flow channel including an inlet hole at an upstream end of the sensing flow channel and a first outlet hole at a downstream end of the sensing flow channel. The sensor is positioned on an outside face of the sensor positioning member at a location facing the sensing flow channel to sense whether liquid is present in the sensing flow channel. The sensor positioning member mounting portion includes a downstream buffer chamber-defining portion that includes an aperture communicating with the first outlet hole and that in conjunction with the sensor positioning member defines a downstream buffer chamber adapted to receive the liquid and the air exiting from the first outlet hole, and a second outlet hole communicating with the downstream buffer chamber and through which the liquid and the air from the downstream buffer chamber exit. Contours of the downstream buffer chamber are defined such that the liquid and the air introduced from the first outlet hole flow to the second outlet hole in nonlinear fashion along a wall face of the downstream buffer chamber.

With the liquid sensing device according to this aspect, in the downstream buffer chamber, the liquid and the air will flow down along the outside wall of the downstream buffer chamber to reach the outlet hole, thereby preventing the air from overtaking the liquid as it flows towards the outlet hole. As a result, despite the presence of air at the downstream end of the fluid flow channel in which the sensor has been positioned, it will be possible to minimize residual liquid in the fluid flow channel. The reliability of sensing outcomes by the sensor can be improved thereby.

In one possible arrangement for the liquid sensing device according to this aspect, the downstream buffer chamber may include a projecting part that defines within the downstream buffer chamber a nonlinear buffer chamber flow channel such that the liquid and the air introduced from the first outlet hole flow through the nonlinear buffer chamber flow channel along the wall face of the downstream buffer chamber to reach the second outlet hole. Thus, employing a simple design, there can be constituted a downstream buffer chamber such that the liquid and the air received from the first outlet hole will flow along the wall face of the downstream buffer chamber to reach the second outlet hole.

In another possible arrangement for the liquid sensing device according to this aspect, the sensor may include a piezoelectric element and is adapted to use the piezoelectric element to oscillate the sensor positioning member and to sense whether the liquid is present. The projecting part may be separated from the sensor positioning member so as not to contact the sensor positioning member. This arrangement will minimize absorption of oscillation of the sensor positioning member by the projecting part, thus limiting the extent to which the projecting part will hamper the ink sensing function of the sensor.

In yet another possible arrangement for the liquid sensing device according to this aspect, a flow channel resistance of a space between the projecting part and the sensor positioning member is greater than a flow channel resistance of the buffer chamber flow channel. By so doing, the liquid and the air will flow more easily through the buffer chamber flow channel than through the space between the projecting part and the sensor positioning member, thus enabling the projecting part to function appropriately so as to define the buffer chamber flow channel, despite the presence of a space between the projecting part and the sensor positioning member.

In yet another possible arrangement for the liquid sensing device according to this aspect, the sensor may include a piezoelectric element and may be adapted to use the piezoelectric element to oscillate the sensor positioning member and sense whether the liquid is present. The sensor positioning member mounting portion further may include an upstream buffer chamber-defining portion that includes an aperture communicating with the inlet hole and that in conjunction with the sensor positioning member defines an upstream buffer chamber adapted to supply the liquid to the inlet hole, and a dividing wall that divides the downstream buffer chamber from the upstream buffer chamber. The sensor positioning member and the sensor positioning member mounting portion may not contact one another in sections other than the dividing wall. This arrangement will minimize absorption of oscillation of the sensor positioning member by the sensor positioning member mounting portion, thus limiting the extent to which the sensor positioning member mounting portion will hamper the ink sensing function of the sensor.

The liquid sensing device according to this aspect may be installed on a liquid container storing the liquid. The sensor positioning member mounting portion may be formed on a liquid container storing the liquid.

The liquid sensing device according to another aspect of the present invention provides a liquid sensing device for use in a liquid consuming system in which air is introduced from an upstream end of the system in association with consumption of liquid at a downstream end of the system. The liquid sensing device according to this aspect comprises a sensor positioning member; a sensor; and a sensor positioning member mounting portion that mounts the sensor positioning member. The sensor positioning member defines a sensing flow channel including an inlet hole at an upstream end of the sensing flow channel and a first outlet hole at a downstream end of the sensing flow channel. The sensor is positioned on an outside face of the sensor positioning member at a location facing the sensing flow channel to sense whether the liquid is present in the sensing flow channel. The sensor positioning member mounting portion includes a downstream buffer chamber-defining portion that includes an aperture communicating with the first outlet hole and that in conjunction with the sensor positioning member defines a downstream buffer chamber adapted to receive the liquid and the air exiting from the first outlet hole, and a second outlet hole communicating with the downstream buffer chamber and through which the liquid and the air from the downstream buffer chamber exit. The downstream buffer chamber fulfills the relationship $0.5\,N < M < 2.5\,N$, where M represents a length of the buffer chamber flow channel in a direction approximately orthogonal to a flow direction of the liquid and the air introduced from the first outlet hole through the buffer chamber flow channel to the second outlet hole, and N represents the length of the first outlet hole in a direction approximately orthogonal to the flow direction through the first outlet hole.

In another possible arrangement for the liquid sensing device according to this aspect, the length M may include a width along an outside face of the sensor positioning member on the sensor positioning member mounting portion side. The length M may include a width in a direction orthogonal to an outside face of the sensor positioning member on the sensor positioning member mounting portion side.

In yet another possible arrangement for the liquid sensing device according to this aspect, the first outlet hole may include round tubular shape and the length N may be a inside diameter of the first outlet hole.

There are any number of other possible aspects for working the invention; for example, a liquid container for a liquid consuming system in which air is introduced from the upstream end in association with consumption of liquid at the downstream end; or a liquid delivery system for a liquid consuming system in which air is introduced from the upstream end in association with consumption of liquid at the downstream end.

The above and other objects, characterizing features, aspects and advantages of the invention will be clear from the description of preferred embodiments presented below along with the attached drawings.

DETAILED DESCRIPTION OF THE PREFERRED EMBODIMENTS

Certain preferred embodiments of the present invention will now be described in detail. The embodiments set forth hereinbelow are not intended to unduly limit the particulars of the present invention recited in the appended claims; nor should all of the arrangements described in the embodiments be construed as essential means for solving the problems addressed by the present invention.

Overview of Ink Cartridge

An ink cartridge (liquid container) equipped with a liquid sensing device according to an embodiment of the present invention will be described with reference to the accompanying drawings.

Figure 1:
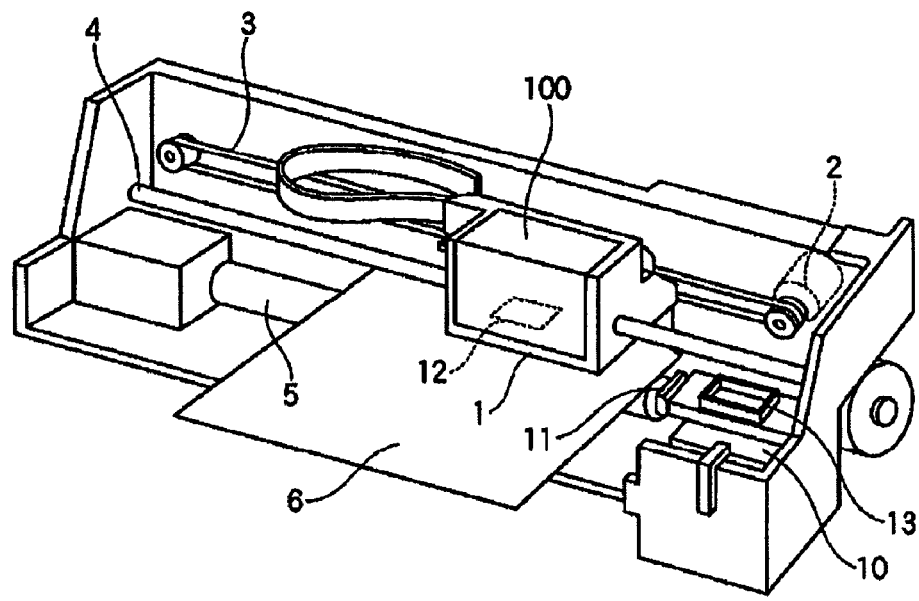
FIG. 1 is a simplified perspective view of an inkjet type printer as the liquid consuming device.

FIG. 1 depicts a simplified arrangement of an inkjet type recording device (liquid consuming device) of the present embodiment. A carriage 1 is arranged so as to permit reciprocating motion, through the agency of a timing belt 3 that is driven by a carriage motor 2, in the axial direction of a platen 5 while guided by a guide member 4.

An inkjet recording head 12 is installed on the carriage 1 on the side thereof facing towards recording paper 6. An ink cartridge 100 for supplying ink to the recording head 12 is detachably mounted in a holder (not shown) provided in the upper part of the carriage 1.

A cap member 13 is situated at the home position (the right side in FIG. 1) which represents the nonprinting zone of the recording device. The cap member 13 is adapted to be pressed against the nozzle face of the recording head 12 to form an airtight space between itself and the nozzle face, when the recording head 12 installed on the carriage 1 is positioned at the home position. To the lower side of the cap member 13 is positioned a pump unit 10 for imparting negative pressure to the airtight space formed by the cap member, and for performing cleaning, etc.

Wiping means 11 furnished with a resilient plate of rubber or the like is disposed in proximity to the nonprinting zone side of the cap member 13, for example so as to be extendable and retractable in the horizontal direction with respect to the travel path of the recording head 12. The wiping means 11 is adapted to wipe the nozzle face of the recording head 12 as needed during reciprocating movement of the carriage 1 towards the cap member 13 side.

Figure 2:
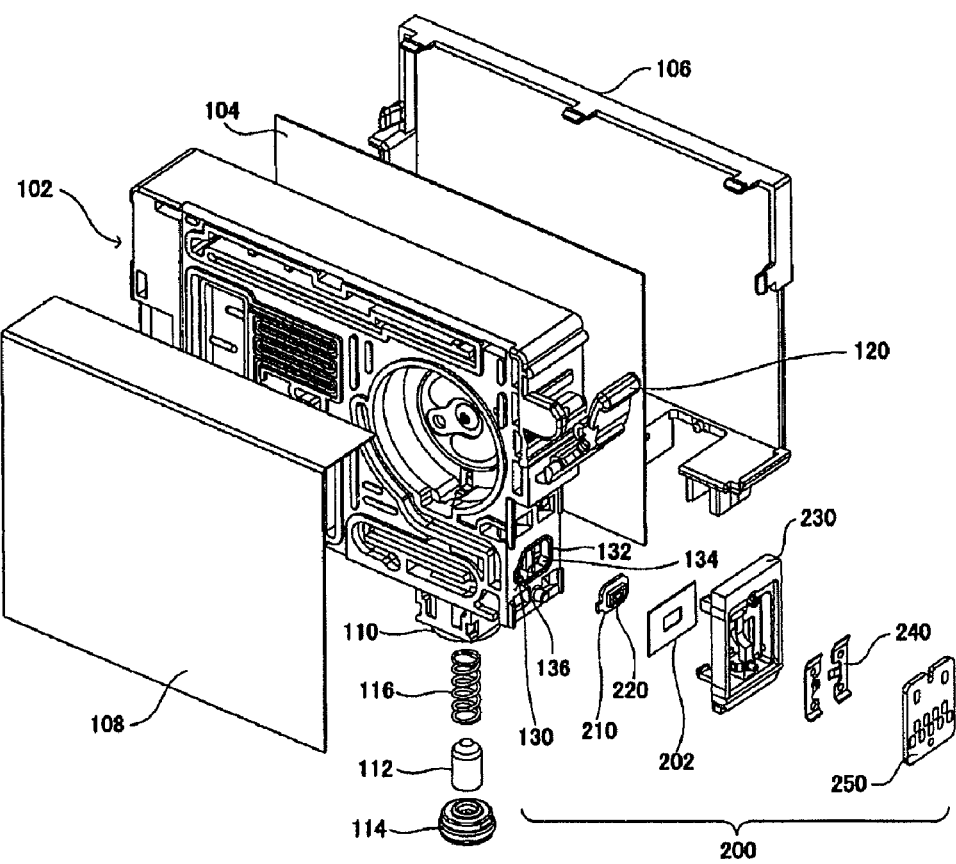
FIG. 2 is an exploded perspective view of an ink cartridge.

FIG. 2 is an exploded perspective view depicting a simplified arrangement of the ink cartridge 100. FIG. 2 depicts the ink cartridge 100 in the same vertical orientation in which it is installed on the carriage 1. Accordingly, in the following description the terms "upper" and "lower" refer to the vertical direction when the ink cartridge 100 has been installed on the carriage 1.

The ink cartridge 100 includes a film 104 disposed covering the back face of a main case 102; a cover body 106 disposed covering the film 104 and the base face of the main case 102; and a film 108 disposed covering the front and top faces of the main case 102.

The main case 102 is intricately compartmentalized by ribs and walls. The main case 102 includes an ink channel portion composed of an ink storage area and an ink delivery channel; an ink-side passage through which the ink storage area communicates with the outside air; and an outside air communicating portion composed of an outside air valve housing chamber and an outside air-side passage; however, a detailed description will not be provided here (see instead Japanese Unexamined Patent Publication 2007-15408 for example).

The ink feed channel of the ink channel portion ultimately communicates with an ink feed portion 110, and the ink inside the ink cartridge 100 is suctioned up through negative pressure from the ink feed portion 110, and fed to the printer.

An ink feed needle (not shown) of the holder provided on the carriage 1 inserts into the ink feed portion 110. The ink feed portion 110 has a supply valve 112 adapted to slide and open when pushed by the ink feed needle; a seal member 114 made of elastic material such as an elastomer, adapted to slip around the perimeter of the ink feed needle; and an urging member 116 composed of a coil spring, adapted to urge the supply valve 112 towards the seal member 114. These elements are assembled by installing the urging member 116, then fitting the seal member 114 into the ink feed portion 110, and finally pushing in the supply valve 112.

A lever 120 adapted to engage the holder which is disposed on the carriage 1 is provided on one side face of the main case 102. At a location on one side face of the main case 102 and situated below the lever 120 for example, there is formed an aperture 130 that constitutes the opening at the terminus of the ink delivery channel. A welding rib 132 is formed about the rim of the aperture 130. A partition rib 136 divides the ink delivery channel 134 facing this aperture 130 into an upstream buffer chamber 134a and a downstream buffer chamber 134b (symbols omitted in FIG. 2; see FIGS. 6 and 7 below).

Ink Sensing Device

Figure 3:
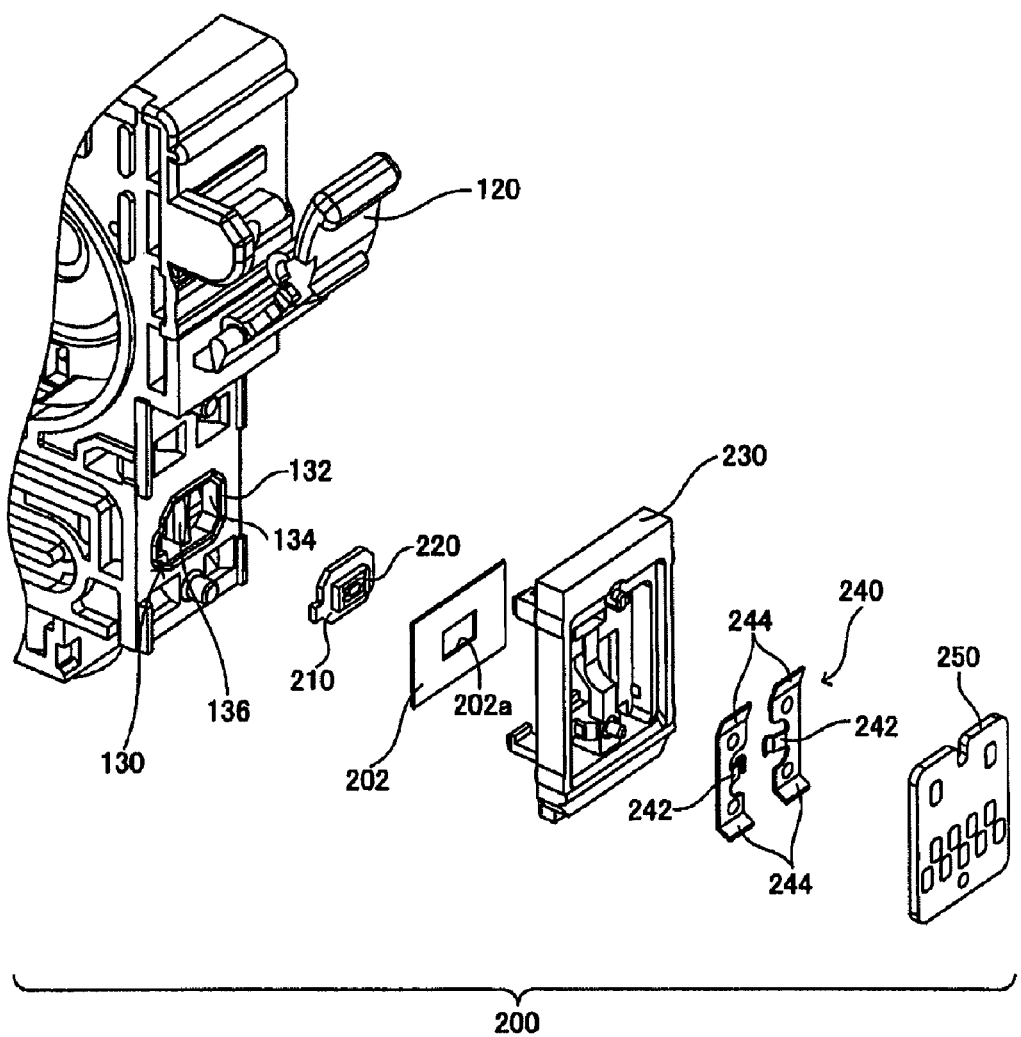
FIG. 3 is an exploded perspective view of an ink detecting device with part of FIG. 2 shown enlarged.

Next, by way of a liquid sensing device according to the present invention, an ink sensing device 200 constructed from the main case 102, the ink delivery channel 134, and the partition rib 136 will be described in general terms with reference to FIGS. 2 and 3. FIG. 3 depicts in enlarged view the ink sensing device 200 of the ink cartridge 100 shown in FIG. 2.

The ink sensing device 200 in FIGS. 2 and 3 includes the main case 102, which is made of resin and in which the ink delivery channel 134 is formed; a sensor base 210 made of metal and positioned facing the ink delivery channel 134 through the aperture 130 of the main case 102; a sensor chip 220 installed on the sensor base 210 on the face thereof opposite from the face facing towards the ink delivery channel 134; a film 202 that holds the sensor base 210 against the aperture 130 and seals the aperture 130; and a partition wall 136 that divides the ink delivery channel 134 into an upstream side and a downstream side inside the main case 102. The film 202 is bonded to the upper face of the sensor base 210, and is also welded to the welding rib 132 about the perimeter of the aperture 130.

The ink sensing device 200 in FIGS. 2 and 3 may further include a retainer cover 230 situated to the upper side of the sensor base 210, the sensor chip 220, and the film 202; a relay terminal 240 housed in the retainer cover 230 and having terminals 242 adapted for electrical contact with the sensor chip 220 via a hole 202a formed in the film 202; and a circuit board 250 housed in the retainer cover 230 and adapted to electrically connect with the terminals 244 of the relay terminal 240. In the ink sensing device 200 according to the present invention, the retainer cover 230, the relay terminal 240, and the circuit board 250 are not indispensable elements.

Figure 4:
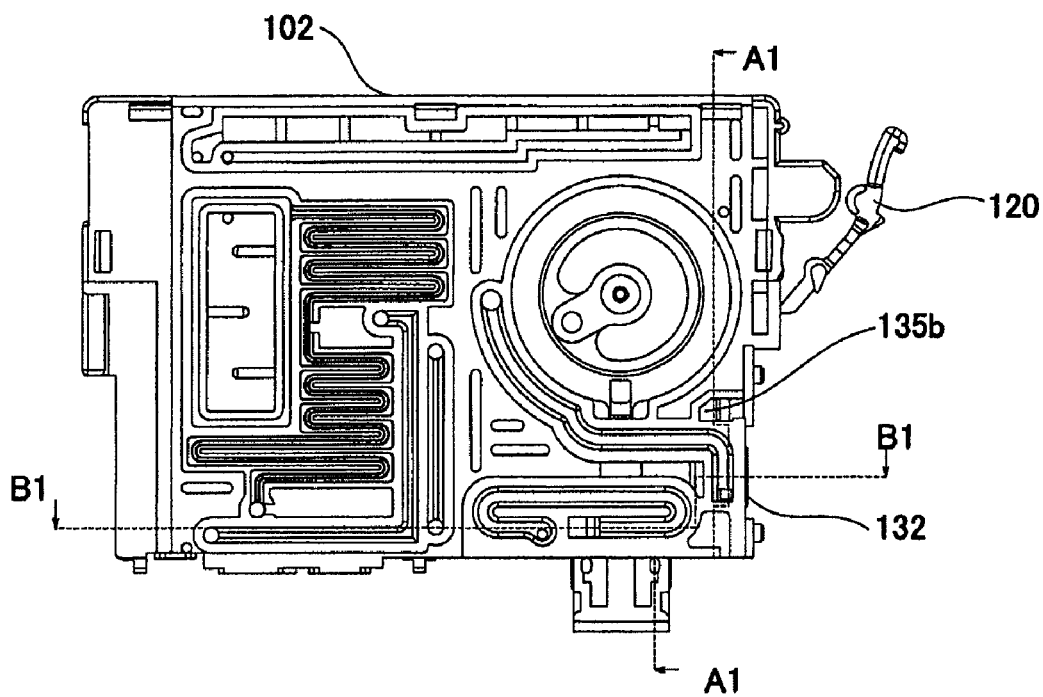
FIG. 4 is a front view of an ink cartridge.
Figure 5:
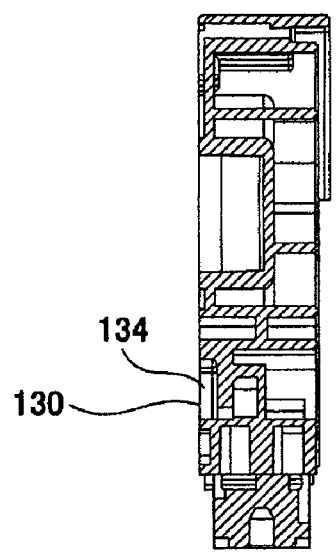
FIG. 5 is a sectional view along A1-A1 in FIG. 4.
Figure 6:
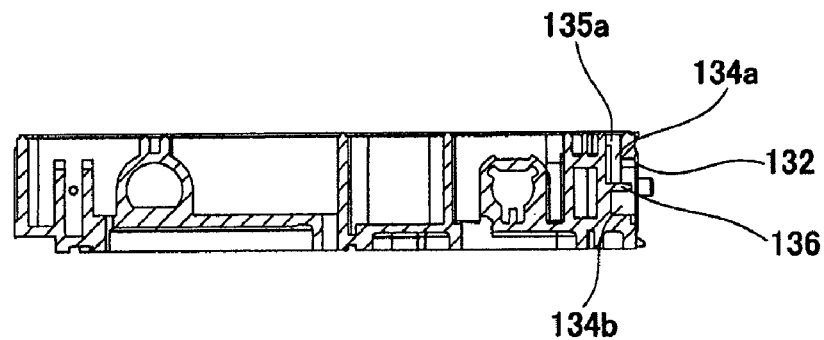
FIG. 6 is a sectional view along B1-B1 in FIG. 4.
Figure 7:
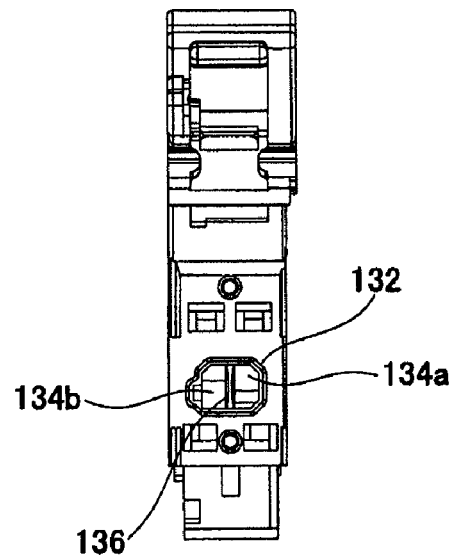
FIG. 7 is a right side view of an ink cartridge.

The ink sensing device 200 will now be described in detail with reference to FIGS. 4 to 11. FIG. 4 is a front view of the main case 102. As depicted in FIG. 5, which is a sectional view along A1-A1 in FIG. 4, the ink delivery channel 134 lies exposed through the aperture 130, at a location on its terminus side before the ink feed portion 110 shown in FIG. 1. As depicted in FIG. 6, which is a sectional view along B1-B1 in FIG. 4, and in FIG. 7 which is a right side view of the ink cartridge 100, the ink delivery channel 134 which lies exposed through the aperture 130 is divided by the partition wall 136 into the upstream buffer chamber 134a and the downstream buffer chamber 134b. As shown in FIG. 6, a feed port 135a is disposed facing the upstream buffer chamber 134a; and as shown in FIG. 4, a discharge port 135b is disposed facing the downstream buffer chamber 134b.

Figure 8:
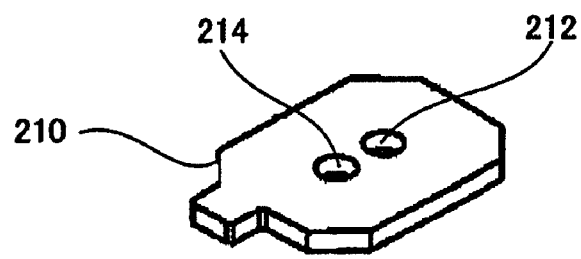
FIG. 8 is a perspective view of a sensor base viewed from the rear.
Figure 9:
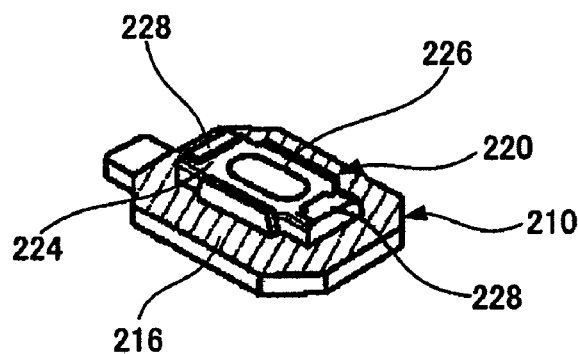
FIG. 9 is a perspective view showing a sensor base installed on a sensor chip, viewed from the front.

FIG. 8 is a perspective view of the sensor base 210 viewed from below. As depicted in FIG. 9, the sensor base 210 is provided with a first hole (feed channel) 212 and a second hole (discharge channel) 214 that pass through it in the thickness direction.

Figure 10:
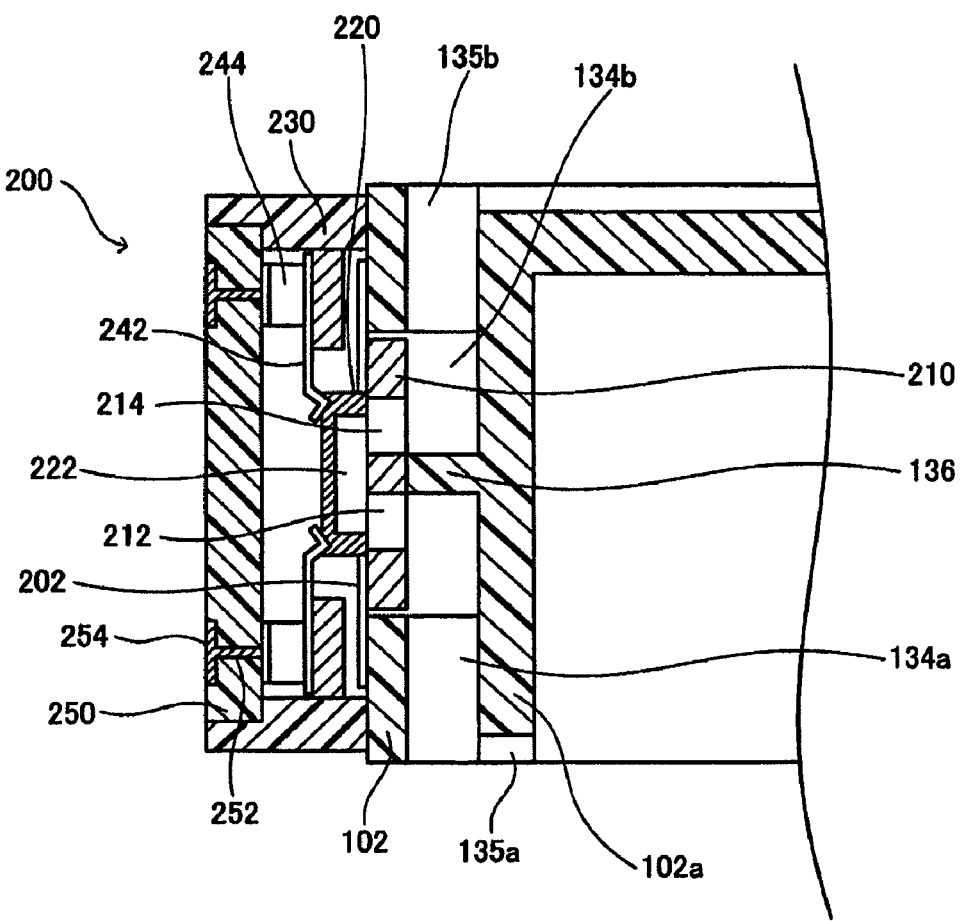
FIG. 10 is a sectional view of an assembled ink detecting device.
Figure 15:
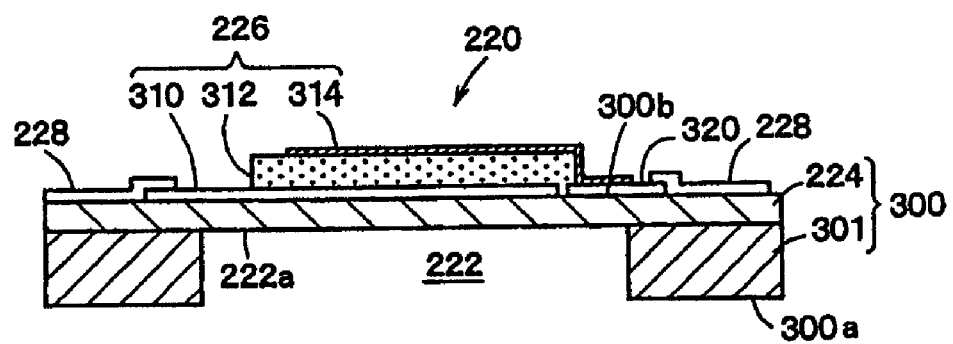
FIG. 15 is a sectional view of a sensor chip.

FIG. 9 is a perspective view showing the sensor base 210 installed on the sensor chip 220, viewed from above. FIG. 10 is a sectional view depicting in model form in the assembled state the ink detecting device 200 shown in FIGS. 2 and 3. FIG. 15 is a sectional view of the sensor chip.

In FIGS. 10 and 15, the sensor chip 220 has a sensor cavity 222 adapted to receive the ink (liquid) targeted for sensing; the lower face of the sensor cavity 222 is open to permit ink to be received. The upper face of the sensor cavity 222 is obstructed by an oscillating plate 224, as shown in FIGS. 9 and 15. Additionally, a piezoelectric element 226 is positioned on the upper face of the oscillating plate 224.

To describe more specifically, as shown in FIG. 15, the sensor chip 220 has an oscillation cavity-defining base portion 300 constructed by stacking the oscillating plate 224 on a cavity plate 301 and having a first face 300a and a second face 300b opposed to one another. The sensor chip 220 is additionally provided with the piezoelectric element 226, which is stacked on the second face 300b side of the oscillation cavity-defining base portion 300.

In the oscillation cavity-defining base portion 300, a cavity 222 of round tubular spatial configuration adapted to receive the ink (liquid) targeted for sensing is formed so as to open onto the first face 300a side; the base face part 222a of the cavity 222 is formed so as to permit oscillation of the oscillating plate 224. In other words, of the oscillating plate 224 as a whole, the contours of its primary oscillating section will be delineated by the cavity 222. Electrode terminals 228, 228 are formed at the two ends of the oscillation cavity-defining base portion 300 on its second face 300b side.

A lower electrode 310 is formed on the second face 300b of the oscillation cavity-defining base portion 300, and this lower electrode 310 is connected to one electrode terminal 228.

A piezoelectric layer 312 is stacked on the lower electrode 310, and an upper electrode 314 is stacked on this piezoelectric layer 312. The upper electrode 314 connects to an ancillary electrode 320 that is insulated from the lower electrode 310. This ancillary electrode 320 is connected to the other electrode terminal 228.

The piezoelectric element 226 basically has the function of determining ink depletion based on differences in electrical characteristics (e.g. frequency) depending on the presence or absence of ink inside the sensor cavity 222, for example. Possible materials that may be used for the piezoelectric layer include lead zirconate titanate (PZT) and lead lanthanum zirconate titanate (PLZT), as well as lead-free piezoelectric films that do not contain lead.

By positioning the sensor chip 220 with the lower face of the chip body resting on the center part of the upper face of the sensor base 210, it is integrally anchored to the sensor base 210 by an adhesive layer 216, while at the same time the sensor base 210 and the sensor chip 220 are sealed together by the adhesive layer 216. As will be appreciated from the description above, the piezoelectric element 226 of the present embodiment corresponds to the sensor taught in the claims, while the oscillation cavity-defining base portion 300 and the sensor base 210 of the present embodiment correspond to the sensor positioning member taught in the claims. The "U" shaped flow channel that includes the first hole 212, the second hole 214, and the cavity 222 (FIG. 14) of the present embodiment corresponds to the sensing flow channel taught in the claims.

Sensing Remaining Ink Level

As shown in FIG. 10, ink entering from the feed port 135a of the ink delivery channel 134 collects in the upstream buffer chamber 134a, which is one of the chambers partitioned off by the partition wall 136.

This upstream buffer chamber 134a communicates with the sensor cavity of the sensor chip 220 via the first hole 212 in the sensor base 210. Thus, in association with the ink being drawn out, the ink inside the upstream buffer chamber 134a will be conducted into the sensor cavity 222 via the first hole 212. At this point, oscillations from the oscillating plate 224 as it is oscillated by the piezoelectric element 226 will be transmitted to the ink, and the presence or absence of ink will be sensed on the basis of the frequency of the resultant residual vibration waveform. At the endpoint at which air has become comingled with ink in the sensor cavity 222, there is appreciable attenuation of the residual vibration waveform so its frequency will be higher as compared to where the cavity is filled with ink. By sensing this point, it will be possible to sense the point of ink depletion.

Specifically, when voltage is applied to the piezoelectric element 226, the oscillating plate 224 will experience deformation in association with deformation of the piezoelectric element 226. When application of voltage ceases subsequent to forced deformation of the piezoelectric element 226, flexural oscillation remains in the oscillating plate 224 for a brief while. This residual oscillation represents free oscillation of the oscillating plate 224 and the medium inside the sensor cavity 222. Accordingly, by employing a pulse waveform or rectangular wave for the voltage that is applied to the piezoelectric element 226, the oscillating plate 224 and the medium can be easily brought to a resonance state subsequent to application of voltage.

This residual oscillation represents oscillation of the oscillating plate 224, and accompanies deformation of the piezoelectric element 226. Thus, back electromotive force will be produced in the piezoelectric element 226 in association with this residual oscillation.

As shown in FIG. 10, the circuit board 250 has an electrode 254 connected to a through-hole 252 that passes between its front and back faces. Via the through-hole 252 and the electrode 254, a signal from the relay terminal 240, which is in contact with the sensor chip 220, will be processed by an analysis circuit (not shown) on board the printer unit, and the result will be sent to a semiconductor memory device (not shown) on board the circuit board 250. Specifically, the back electromotive force of the piezoelectric element 226 will be transmitted via the relay terminal 240 to the analysis circuit, and the result will be saved to the semiconductor memory device.

Since the resonance frequency can be identified by back electromotive force sensed in the above manner, the presence or absence of ink in the ink cartridge 100 can be sensed on the basis of this resonance frequency. The semiconductor memory device also stores identifying information indicating the type of ink cartridge 100 etc., information regarding the color of ink in the ink cartridge 100, information about current ink level, and so on.

As the ink continues to be drawn out, the ink which has collected inside the sensor cavity 222 will be conducted into the downstream buffer chamber 134b via the second hole 214 of the sensor base 210. The ink will then be drawn along the ink delivery channel 134 via the discharge port 135b, and finally discharged from the ink cartridge 100 via the ink feed portion 110 (see FIG. 2).

Sensor Base Support Method and Supporting Structure

The following two steps are necessary in order to attach the sensor base 210, the sensor chip 220, and the film 202 to the aperture 130. Specifically, a first step in which the metal sensor base 210 which has been installed on the sensor chip 220 is positioned facing the ink delivery channel 134 through the aperture 130 of the main case 102 in which the channel 134 has been formed; and a second step in which the film 202 is welded to the rib 132 about the perimeter of the aperture 130, to support the sensor base 210 on the main case 102 via the film 202, are required. Through the first and second steps, the sensor cavity 222 which has been formed in the sensor chip 220 will be positioned in communication with the upstream buffer chamber 134a via the first hole 212 formed in the sensor base 210, and in communication with the downstream buffer chamber 134b via the second hole 214 formed in the sensor base 210, thereby forming a sensing flow channel for the liquid, as mentioned earlier.

In the present embodiment, during the first step prior to welding of the film 202, the sensor base 210 will be supported by the partition wall 136 exclusively (partition wall support function). This is because the sensor base 210 must be positioned at a prescribed location on the aperture 130 prior to welding the perimeter of the aperture 130 to the welding rib 132. Once the sensor base 210 has been supported by the film 202 in the second step, in the depthwise direction of the aperture 130, it will be possible for the sensor base 210 to be in exclusive contact with the partition wall 136 (partition wall upstream/downstream division function). Since the sensor base 210 is supported by the film 202, the sensor base 210 need not be positioned in contact against the partition wall 136 on an ongoing basis; however, it is preferable to do so, so that the upstream/downstream division function of the partition wall 136 may be exhibited on an ongoing basis.

In the present embodiment, as depicted in FIG. 10, a flow channel wall 102a is positioned facing the sensor base 210 in order to compartmentalize the ink delivery channel 134. The partition wall 136 is integrally formed with this flow channel wall 102a. This partition wall 136 is the preferred structure for dividing the ink delivery channel 134 into the upstream buffer chamber 134a and the downstream buffer chamber 134b. The reason is that if the partition wall 136 were not present, it would not be possible to ensure that the medium (i.e. ink) or air bubbles inside the ink delivery channel 134 pass through the sensor cavity 222. If the ink or air bubbles inside the ink delivery channel 134 do not pass through the sensor cavity 222, the sensor chip 220 may err in sensing the ink end point.

In order to divide the ink delivery channel 134 into the upstream buffer chamber 134a and the downstream buffer chamber 134b, in preferred practice either the partition wall 136 will be positioned abutting the sensor base 210; or positioned with only a very small gap such that at least air bubbles are prevented from passing through, present between the sensor base 210 and the partition wall 136. In other words, it is preferable for the flow channel resistance of the gap to be higher than the flow channel resistance of the first hole 212, preventing at least air bubbles from passing through.

Meanwhile, during mounting of the sensor base 210 (the first step), the partition wall 136 can be supported through abutment against the sensor base 210, preventing the sensor base 210 from dropping down into the aperture 130. Specifically, in the first step, the partition wall 136 has the function of providing temporary support to the sensor base 210.

Even after the film 202 has been welded to the welding rib 132 about the perimeter of the aperture 130, and the sensor base 210 and the sensor chip 220 have been attached to the aperture 130, apart from the sensor chip 220 and the film 202 the sensor base 210 will be in exclusive contact with the partition wall 136. That is, in the depthwise direction of the aperture 130, it will be possible for the sensor base 210 to be in exclusive contact with the partition wall 136.

This makes it possible for the piezoelectric element 226 to sense the residual vibration waveform. The reason is that in the present embodiment the main case 102 of the ink sensing device 200 constitutes part of the main case of the ink cartridge 100, and has large capacity. Typically, the main case 102 is made of flexible resin material such as polypropylene for example, so if capacity is large, vibration absorption will be high as well.

When the piezoelectric element 226 oscillates, the sensor chip 220 and the sensor base 210 installed on this sensor base 210 will oscillate as well, in addition to the oscillating plate 224. If the contact area between the sensor base 210 and the main case 102 is large, oscillation of the sensor base 210 will be absorbed by the main case 102. In this case, there is a risk that the residual vibration waveform will lack sufficiently large amplitude to be sensed by the piezoelectric element 226.

In the present embodiment, because the sensor base 210 is supported exclusively by the film 202 and the partition wall 136, absorption of oscillating waves by the main case 102 will be minimized and sufficient amplitude for sensing by the piezoelectric element 226 will be assured.

Figure 11:
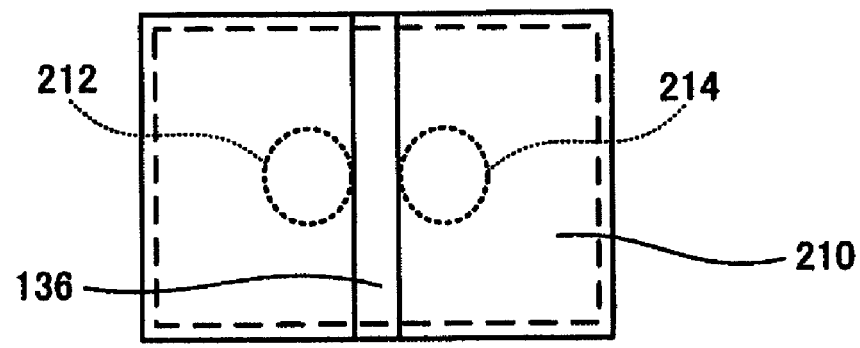
FIG. 11 is a schematic illustration of positional relationships among the partition wall and the first and second holes of the sensor base.

FIG. 11 is an illustration of the partition wall 136 sliced midway along and viewed from below. The partition wall 136 is situated between the first and second holes 212, 214 of the sensor base 210. Also, maximum thickness at the distal end part of the partition wall 136 will preferably be such that the partition wall 136 is tangent to the first and second holes 212, 214; but should not obstruct the first and second holes 212, 214, as doing so would increase the flow channel resistance of the first and second holes 212, 214, which has been designed to a prescribed level.

Figure 16:
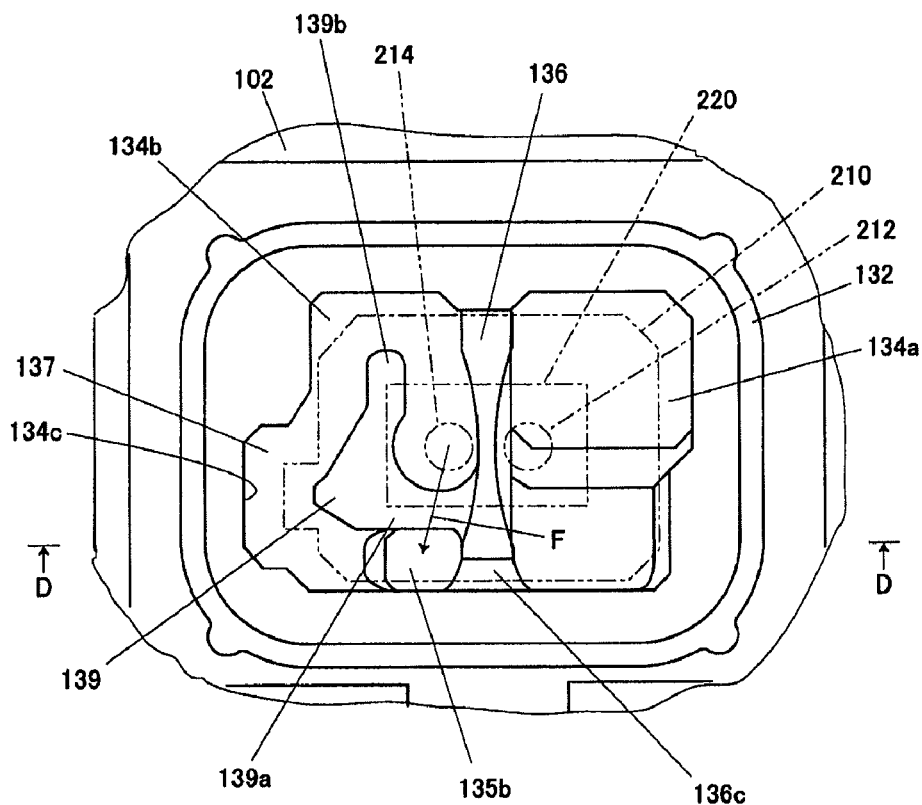
FIG. 16 is an enlarged front view depicting an aperture 130 of a main case 102.
Figure 17:
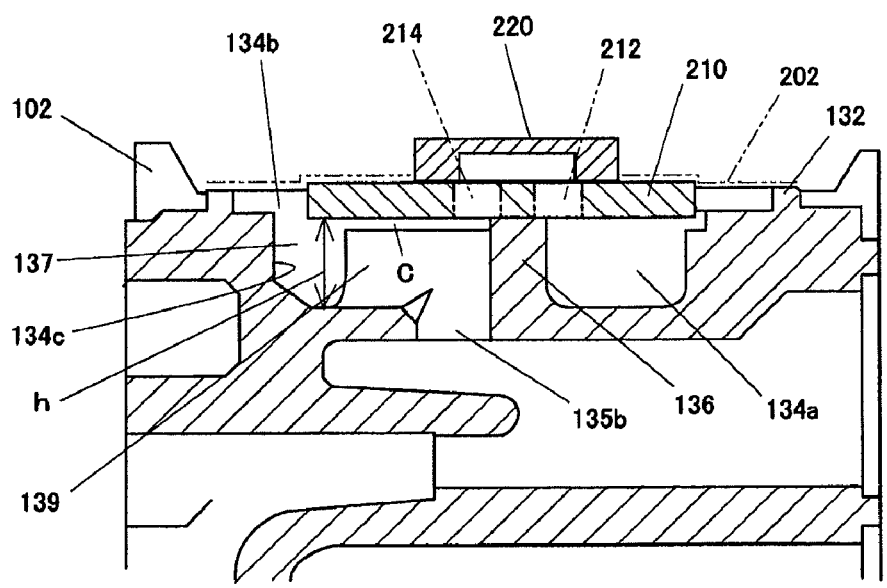
FIG. 17 is a sectional view along D-D in FIG. 16.
Figure 18:
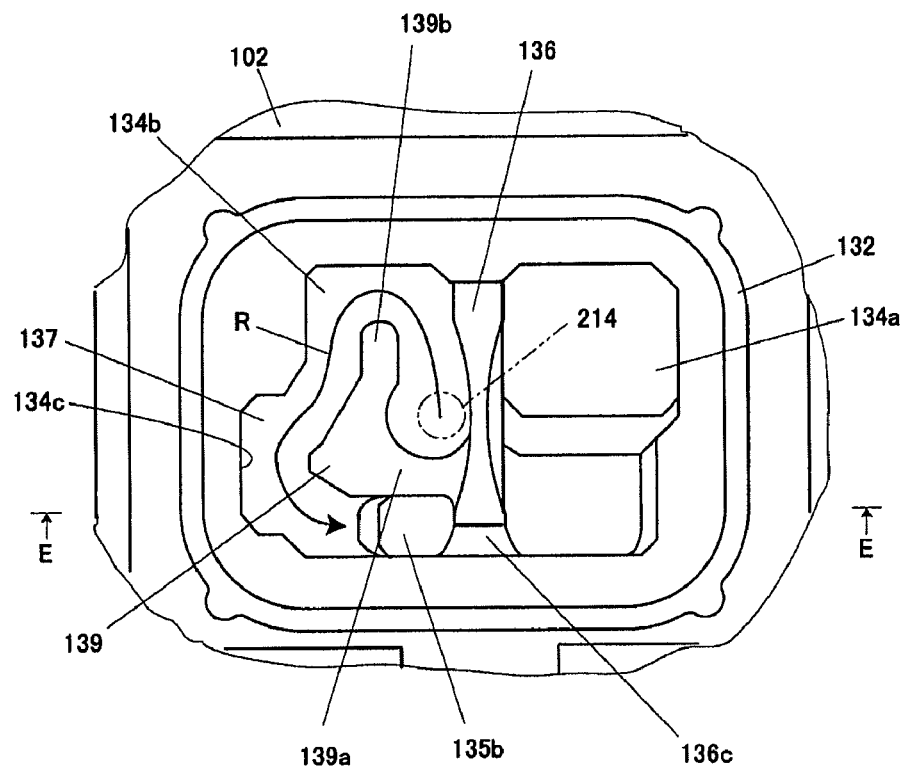
FIG. 18 is an enlarged front view depicting the aperture 130 of the main case 102 with the sensor chip 220 and the sensor base 210 detached.
Figure 19:
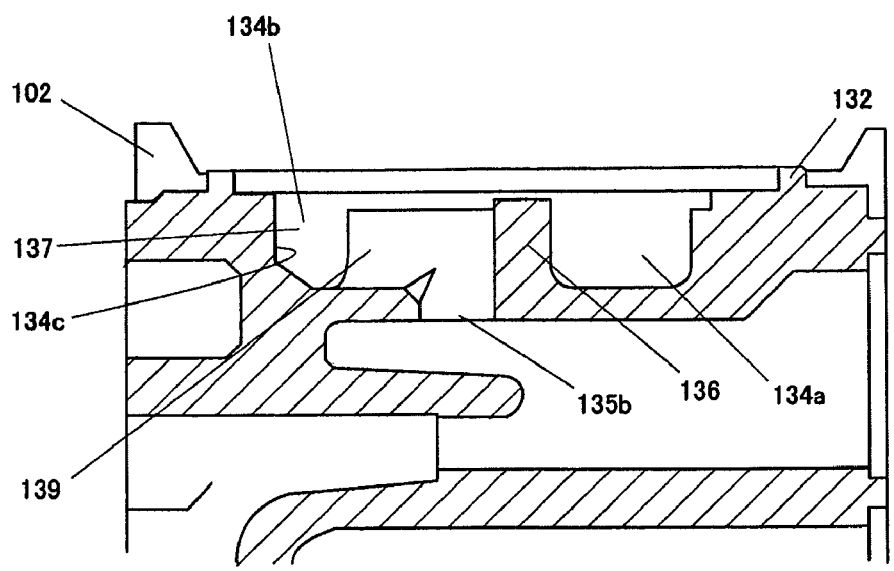
FIG. 19 a sectional view along E-E in FIG. 18.

FIG. 16 is an enlarged front view depicting the aperture 130 of the main case 102; and FIG. 17 is a sectional view along D-D in FIG. 16. FIG. 18 is an enlarged front view depicting the aperture 130 of the main case 102 with the sensor chip 220 and the sensor base 210 detached; and FIG. 19 is a sectional view along E-E in FIG. 18.

As shown in these drawings, the downstream buffer chamber 134b, which collects the liquid that has flowed out from the second hole 214 of the sensor base 210, includes an outlet (discharge port) 135b for liquid from the downstream buffer chamber 134b, and a bypass circuit-defining part 139 that defines a bypass circuit 137 bypassing the flow channel of the downstream buffer chamber 134b.

This bypass circuit-defining part 139 is situated at least on a straight line connecting the second hole 214 and the liquid outlet 135b (see arrow F), and blocks the movement of air bubbles (not shown) that would ordinarily travel on a straight line representing the shortest distance from the second hole 214 to the outlet 135b (see arrow F) as well as defining a bypass circuit 137 through which air bubbles may bypass the interior of the downstream buffer chamber 134b.

In the present embodiment, the bypass circuit-defining part 139 defines the bypass circuit 137 so as to extend in substantially the opposite direction from the direction going from the second hole 214 toward the outlet 135b.

In the model diagram in FIG. 10, to aid understanding the liquid outlet 135b is depicted as being situated to the side of the downstream buffer chamber 134b; however, it is actually situated at the lowermost end location of the downstream buffer chamber 134b as shown in FIGS. 16 and 18.

If the bypass circuit 137 defined by the bypass circuit-defining part 139 were not present in the downstream buffer chamber 134b, there would occur a phenomenon whereby in the large-capacity downstream buffer chamber 134b in which some ink still remains, only the fine froth of bubbles would pass in a straight-line path equivalent to the shortest distance from the second hole 214 of the sensor base 210 to the outlet 135b of the downstream buffer chamber 134b, as depicted by arrow F.

In instances where under normal circumstances ink depletion would be sensed, because the fine froth of bubbles passes through while liquid still remains, in some instances ink depletion may not be sensed because the sensor cavity 222 remains filled with ink.

By forming the bypass circuit 137 in the downstream buffer chamber 134b however, the fine froth of bubbles will be prevented from being transported along a straight-line path towards the outlet 135b of the downstream buffer chamber 134b as depicted by arrow F. Specifically, the bypass circuit-defining part 139 has a first wall (rib) 139a that obstructs straight-line flow over the shortest distance from the second hole 214 to the outlet 135b.

In the present embodiment, air bubbles will not form a fine froth, but will instead act in such a way that ink remaining in the downstream buffer chamber 134b is pushed along towards the outlet 135b of the downstream buffer chamber 134b by the air bubbles. For this reason, according to this liquid sensing device, when the level of liquid inside the sensing target, i.e. the liquid container, drops below a prescribed value and air has become comingled in the downstream buffer chamber 134b as a result, the quantity of liquid remaining in the downstream buffer chamber 134b will be conducted towards the outlet 135b in a reliable manner so that the sensor cavity 222 fills with air, thus minimizing sensor error during liquid sensing.

Moreover, if for some reason the ink should backflow, for example due to some event occurring on the liquid consuming device (inkjet recording device) side, the backflowing ink will be received by the bypass circuit 137 and prevented from flowing into the sensing cavity 222. Consequently, sensor error caused by ink backflow can be largely avoided, and damage to the sensor chip 220 can be largely avoided.

In the present embodiment, the bypass circuit-defining part 139 can have a second wall (rib) 139b that defines a bypass circuit towards the substantially opposite direction of the direction going from the second hole 214 towards the outlet 135b of the downstream buffer chamber 134b.

As shown in FIGS. 16 and 18, the bypass circuit 137 is a bypass circuit routed along the inside wall face 134c of the buffer chamber 134b, viewed from the axial direction of the second hole 214. Specifically, as shown in FIG. 18, the bypass circuit-defining part 139 has "L" shaped contours defined by the first wall 139a which partitions off the second hole 214 from the outlet 135b, and the second wall 139b which conducts bubbles upward from the second hole 214, whereby the bypass circuit 137 is constituted along the side wall face 134 of the buffer chamber 134b.

The bypass circuit 137 will afford the above advantages even if not routed along the inside wall face 134c of the downstream buffer chamber 134b. However, by defining the contours of the bypass circuit 137 so as to conform to the inside wall face 134c of the downstream buffer chamber 134b, liquid which tends to remain inside the buffer chamber 134b can be reliably pushed towards the outlet 135b by bubbles. Consequently, when the level of liquid inside the sensing target has dropped below a prescribed value and air has become comingled in the liquid flow channel, the quantity of liquid remaining in the buffer chamber 134b can be reduced in a reliable manner, thus reliably minimizing sensor error during liquid sensing.

As shown in FIG. 17, the bypass circuit-defining part 139, like the partition wall 136 described earlier, does not contact the sensor base 210. That is, the rib height of the bypass circuit-defining part 139 is equal to or less than the rib height of the aforementioned partition wall 136. By so doing, oscillation of the sensor base 210 will not be impaired due to contact between the partition wall 136 and the bypass circuit-defining part 139. As noted, oscillation of the sensor chip 220 brings about oscillation of the sensor base 210, and oscillation of the sensor base 210 brings about oscillation of the sensor chip 220. Consequently, by avoiding a situation where oscillation of the sensor base 210 is impaired due to contact between the partition wall 136 and the bypass circuit-defining part 139, the accuracy of the sensor chip 220 in sensing the presence or absence of liquid can be improved.

However, the flow channel resistance of the space C between the bypass circuit-defining part 139 and the sensor base 210 will be greater than the flow channel resistance of the bypass circuit 137 per se. Thus, the space C will cease to function as a flow channel, and passage of bubbles through the space C, as depicted by arrow F for example, can be obstructed. Functionality as the bypass circuit-defining part 139 can be ensured thereby. As will be appreciated from the discussion above, the bypass circuit-defining part 139 in the present embodiment corresponds to the projecting part taught in the claims.

Figure 20:
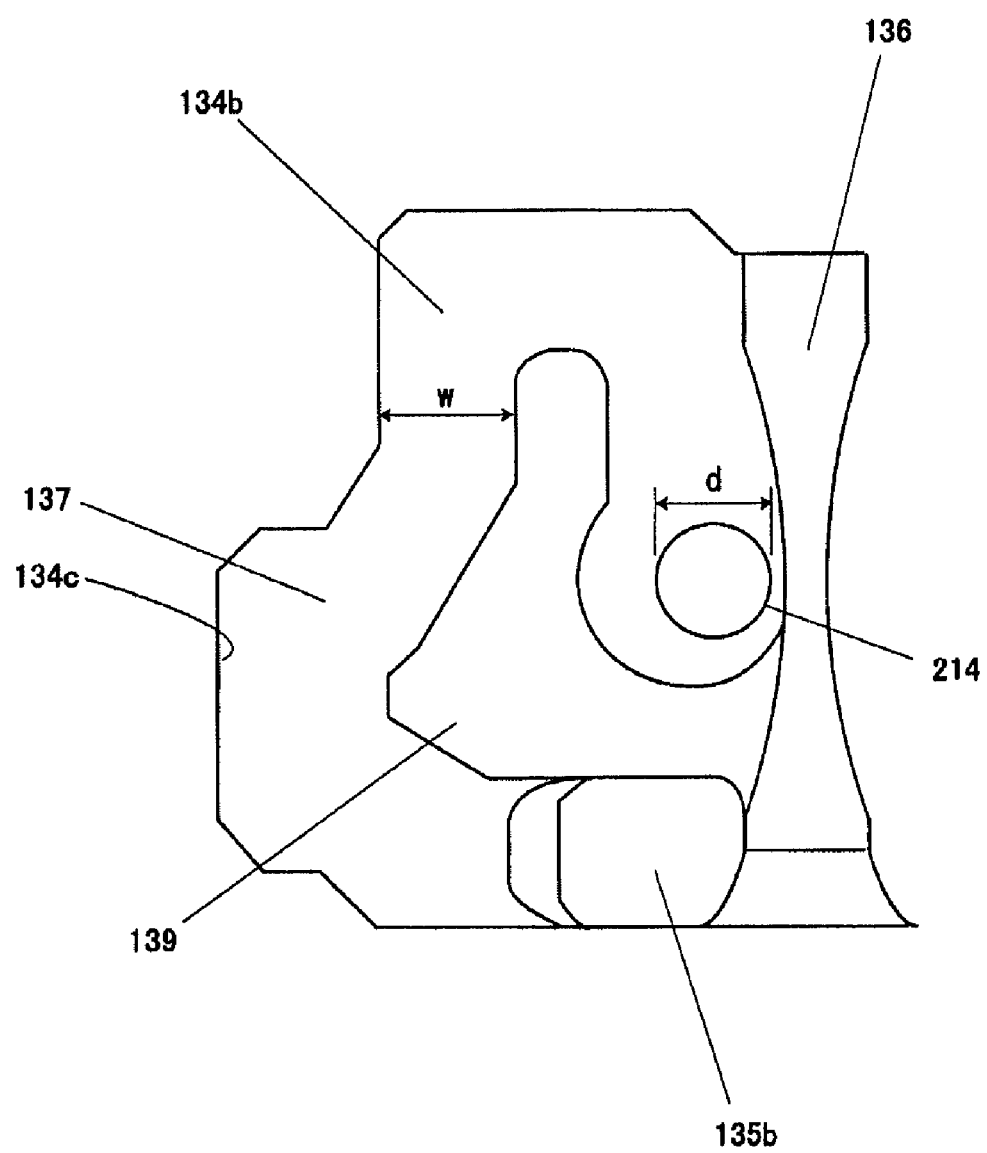
FIG. 20 is a diagram depicting a relationship between width d of a second hole 214 and flow channel width w of a bypass circuit 137.

As depicted in FIG. 20, where d denotes the width of the second hole 214 (in this case, the diameter), the flow channel width w of the bypass circuit 137 will preferably fulfill the relationship 0.5 d<w<2.5 d. If the flow channel width w is equal to or less than 0.5 d, bubbles and liquid will not readily flow through; while conversely if the flow channel width w is equal to or greater than 2.5 d, liquid will avoid being pushed out by air bubbles in the bypass circuit 137, and will tend to be left behind. In FIG. 20, "w" is shown only in part; however, the relationship of 0.5 d<w<2.5 d for flow channel width w applies over the entire length of the bypass circuit 137.

In FIG. 17, where h denotes the depth of the bypass circuit 137, the relationship between the depth h and the flow channel width d of the bypass circuit 137 will preferably be such that 0.5 d<h<2.5 d. In this instance as well, if the depth h is equal to or less than 0.5 d, bubbles and liquid will not readily flow through; while conversely if the depth h is equal to or greater than 2.5 d, liquid will avoid being pushed out by air bubbles in the bypass circuit 137, and will tend to be left behind.

In FIG. 16, 136c is a bypass hole through which the upstream buffer chamber 134a and the downstream buffer chamber 134b communicate. This bypass hole 136c is formed by cutting away part of the partition wall 136. When the amount of remaining liquid has declined to the point that the level in the upstream buffer chamber 134a is at or below the first hole 212, the liquid in the upstream buffer chamber 134a will drain out to the outlet 135b through the bypass hole 136c.

Variations

While a preferred embodiment has been described in detail hereinabove, numerous variations will be readily apparent to the practitioner of the art without substantially departing from the novelty and effects of the present invention. Accordingly, such modified examples will fall within the scope of the present invention. For example, terms that in at least one instance appear together with different terms of broader or identical meaning in the specification and drawings may be replaced with these different terms, at any point in the specification or drawings.

Figure 12A:
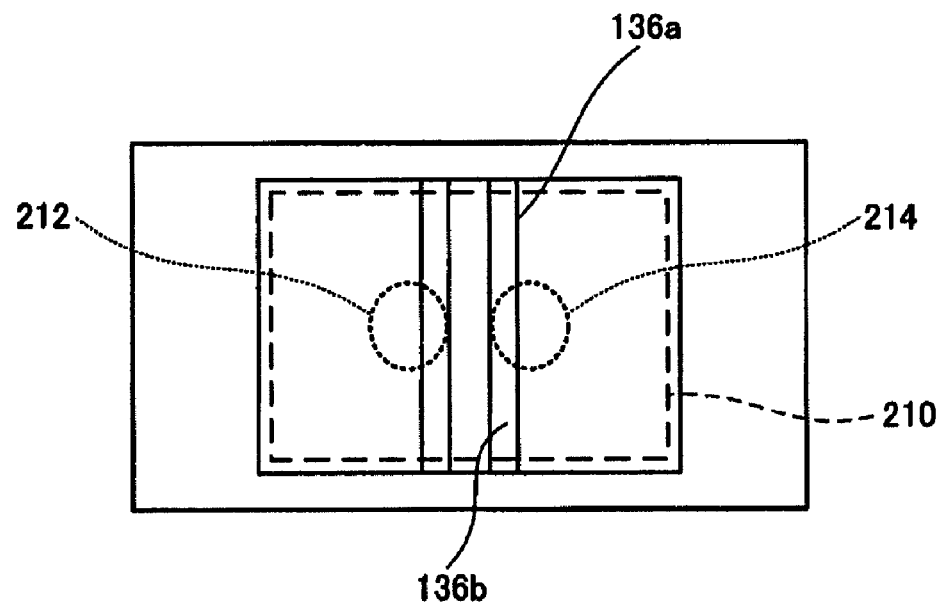
FIGS. 12A and B are diagrams depicting a modified example of a partition wall.
Figure 12B:
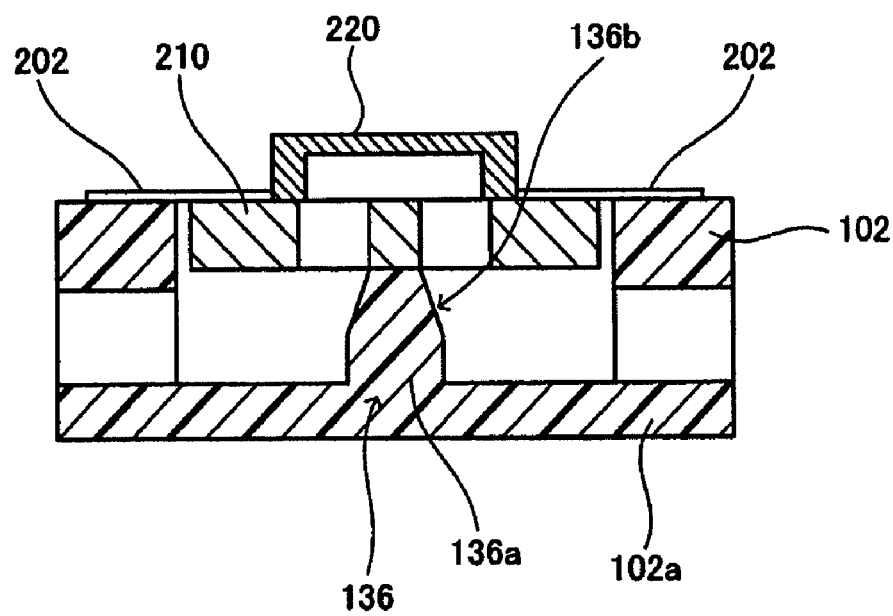

The partition wall 136 may be imparted with a tapering shape of reduced thickness at the free end 136b as compared to that at the basal end 136a on the flow channel wall 102a side, as depicted in FIGS. 12A and B. That is, even where the basal end 136a is wider than the distance between the edges of the first and second holes 212, 214, as in FIG. 10, thickness at the free end 136b should be equal to or less than the distance between the edges. This is so as to avoid increasing flow channel resistance in the first and second holes 212, 214. By making the basal end 136a thicker, ease of molding during injection molding can be improved. Another method for making the free end 136b thinner, besides providing sloping taper faces as depicted in FIG. 12B, would be to impart the free end with curved contours.

Figure 13A:
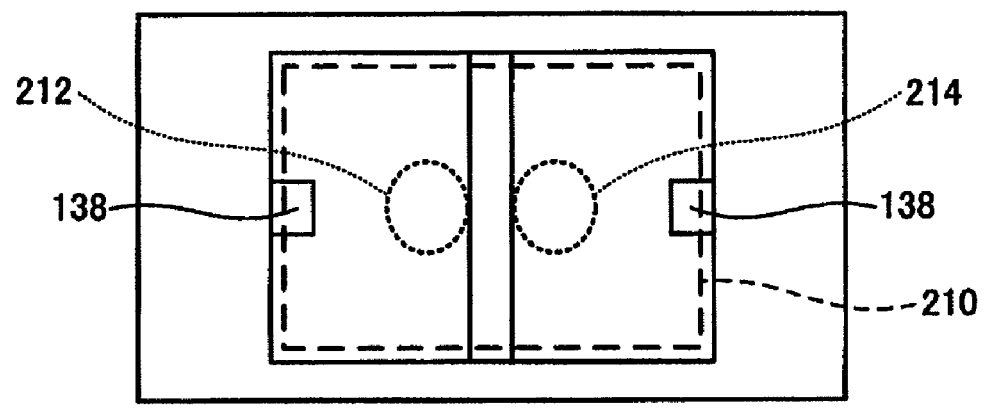
FIGS. 13A and B are diagrams depicting a modified example in which an ancillary support part is provided.

An arrangement like that depicted in FIGS. 13A and B would be acceptable in order to enhance stability during attachment of the sensor base 210. Specifically, ancillary support ribs 138 may be provided in addition to the partition wall 136. In FIGS. 13A and B, two ancillary support ribs 138 are positioned so as to abut the sensor base 210 at both of its lengthwise ends. However, the height H1 of the two ancillary support ribs 138 from the flow channel wall 102a to their distal end is smaller than the height H2 to the distal end of the partition wall 136.

In the embodiment depicted in FIG. 10, during attachment of the sensor base 210 it will be supported exclusively by the partition wall 136, and thus the sensor base 210 is supported at the center like a see-saw, so stability may be poor in some instances. In the embodiment depicted in FIGS. 13A and B, even if the sensor base 210 is inclined, the descending end will come into contact against an ancillary support rib 138, thereby providing two-point support in conjunction with the partition wall 136.

Figure 13B:
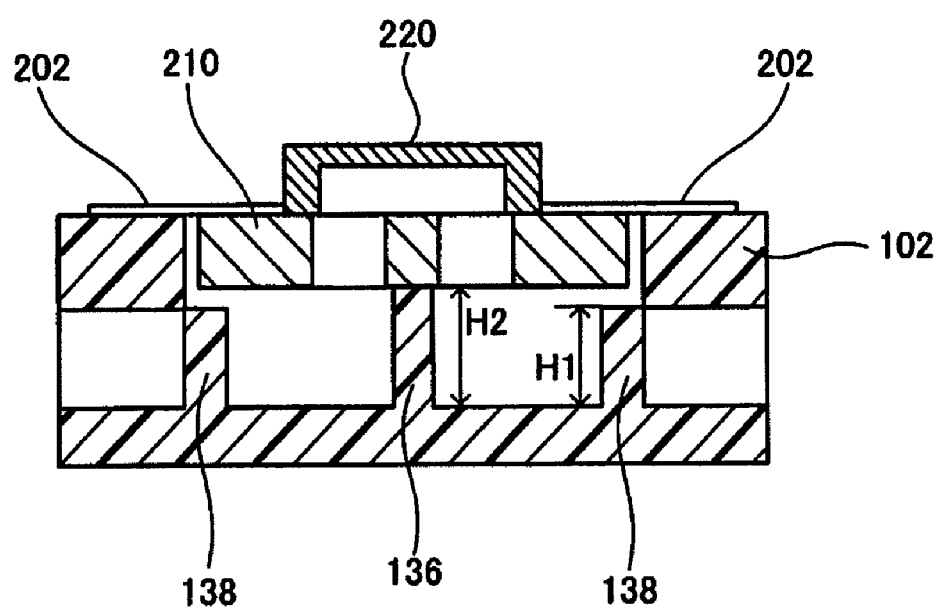

However, once the sensor base 210 has been assembled, since the sensor base 210 is positioned approximately parallel to the flow channel 102a the sensor base 210 will not contact the ancillary support ribs 138, as depicted in FIG. 13B. Thus, as in FIG. 10, sufficient amplitude of the residual vibration waveform can be assured.

Also, even after the sensor base 210 has been assembled, the ancillary support ribs 138 will function to limit excessive incline of the sensor base 210 under abnormal circumstances, such as if subjected to the action of the impact force of being dropped. Thus, the sensor base 210 supported on the film 202 can be prevented from excessive incline and from puncturing the film 202.

Figure 14:
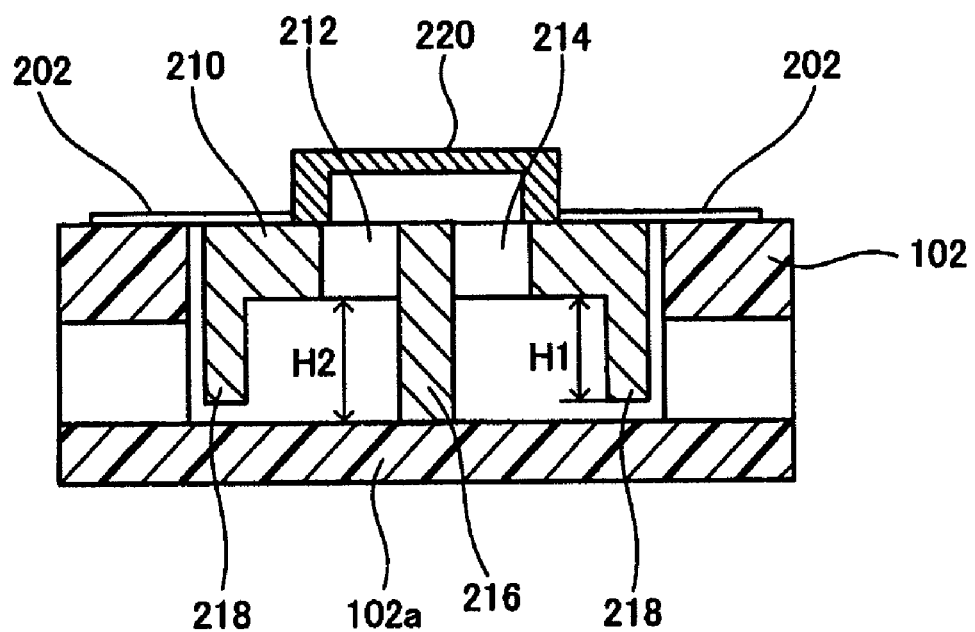
FIG. 14 is a diagram depicting a modified example in which the partition wall and the ancillary support part are disposed on the sensor base side.

The partition wall 136 is not limited to being disposed on the flow channel wall 102a. For example, as depicted in FIG. 14, a partition wall 216 could instead be disposed descending from a point between the first and second holes 212, 214 of the sensor base 210. This partition wall 216 will either contact the flow channel wall 102a, or face it across a very small gap having greater flow channel resistance than the flow channel resistance of the first hole 212. In FIG. 14, there are additionally provided ancillary support ribs 218 that descend from locations at the lengthwise ends of the sensor base 210, for example. The height H1 of the two ancillary support ribs 218 from the lower face of the sensor base 210 to their distal end is smaller than the height H2 to the distal end of the partition wall 136. This arrangement affords effects comparable to the embodiment illustrated in FIGS. 13A and B. Alternatively, the partition wall could be disposed on either the flow channel wall 102a or the sensor base 210, and the ancillary support ribs disposed on the other. Where the partition wall 136 and/or ancillary support ribs 281 are to be provided on the sensor base 210 in this way, the sensor base 210 may undergo a cutting process, for example.

The present invention is not limited to application in ink cartridges for use in ink-jet recording devices. It may be adapted for use in liquid consuming devices of various kinds equipped with a liquid jetting head adapted to eject small amounts of a liquid in drop form.

Specific examples of liquid consuming devices include devices equipped with a coloring matter jetting head used to manufacture color filters in liquid crystal displays; devices equipped with an electrode material (electrode paste) jetting head used to produce electrodes in organic EL displays, field emission displays (FED) or the like; devices equipped with a bioorganic substance jetting head used in biochip manufacture; devices equipped with a specimen jetting head as a precision pipette; textile printing devices; and microdispensers.

The liquid sensing device of the present invention is not limited to use in ink cartridges of on-carriage type, and could also be incorporated into a sub-tank not installed on the carriage, or in ink cartridges of off-carriage type.

In the preceding embodiment, the case body of the liquid sensing device constitutes part of the case body of the liquid container, and the silicone rubber and spring as taught in Patent Citation 2 are eliminated; however no particular limitation is imposed thereby. The liquid sensing device may be constituted as a separate unit from the case body of the liquid container. In this instance, while it may not be possible to eliminate the silicone rubber and the spring and the unit case may be larger, vibration absorption by the unit case can be kept to a minimum, thus contributing to ensuring large amplitude on the part of the sensed waveform.

In the preceding embodiment, the liquid jetting device could be embodied in a printer of full-line type (line head type) in which in the direction orthogonal to the transport direction (front-back direction) of the recording paper (not shown), the recording head 19 has overall dimension corresponding to the length of the recording paper (not shown) in the width direction (left-right direction).

While the preceding embodiment described the liquid jetting device embodied as an inkjet printer 11, no particular limitation is imposed thereby, and embodiment in any number of liquid jetting devices adapted to jet or eject liquids other than ink (including liquid-form substances that incorporate particles of functional materials in dispersed or dissolved form in a liquid, and fluid-form substances such as gels) would be possible as well. Examples of such liquid jetting devices would include liquid jetting devices adapted to jet liquid-form substances that contain materials such as electrode materials or coloring matter (pixel material) in dispersed or dissolved form, and employed in manufacturing liquid crystal displays, EL (electroluminescence) displays or field emission displays; liquid jetting devices adapted to jet bioorganic substances used in biochip manufacture; or liquid jetting devices adapted to jet liquids as specimens for use as precision pipettes. Additional examples are liquid jetting devices for pinpoint jetting of lubricants onto precision instruments such as clocks or cameras; liquid jetting devices adapted to jet an ultraviolet-curing resin or other transparent resin solution onto a substrate for the purpose of forming a micro semi-spherical lens (optical lens) for use in optical communication elements etc.; liquid jetting devices adapted to jet an acid or alkali etchant solution for etching circuit boards, etc.; or liquid jetting devices adapted to jet fluids such as gels (e.g. physical gels). The present invention can be implemented in any of the above classes of liquid jetting device. The term "liquid: is used herein as a concept that excludes liquids composed of gases only; liquids herein include, for example, inorganic solvents, organic solvents, solutions, liquid resins, liquid metals (molten metals), etc. as well as liquid-form substances and fluid-form substances.

While the technology pertaining to the invention have been shown and described on the basis of the embodiments and variations, the embodiments of the invention described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A liquid sensing device for use in a liquid consuming system in which air is introduced from an upstream end of the system in association with consumption of liquid at an downstream end of the system, the liquid sensing device comprising:
    a sensor positioning member that defines a sensing flow channel including an inlet hole at an upstream end of the sensing flow channel and a first outlet hole at a downstream end of the sensing flow channel;
    a sensor positioned on an outside face of the sensor positioning member at a location facing the sensing flow channel to sense whether liquid is present in the sensing flow channel;
    a sensor positioning member mounting portion that mounts the sensor positioning member,
    wherein the sensor positioning member mounting portion includes:
    a downstream buffer chamber-defining portion that includes an aperture communicating with the first outlet hole and that in conjunction with the sensor positioning member defines a downstream buffer chamber adapted to receive the liquid and the air exiting from the first outlet hole; and
    a second outlet hole communicating with the downstream buffer chamber and through which the liquid and the air from the downstream buffer chamber exit,
    and wherein contours of the downstream buffer chamber are defined such that the liquid and the air introduced from the first outlet hole flow to the second outlet hole in nonlinear fashion along a wall face of the downstream buffer chamber,
    wherein the sensor includes a piezoelectric element and is adapted to use the piezoelectric element to oscillate the sensor positioning member and sense whether the liquid is present;
    the sensor positioning member mounting portion further includes:
    an upstream buffer chamber-defining portion that includes an aperture communicating with the inlet hole and that in conjunction with the sensor positioning member defines an upstream buffer chamber adapted to supply the liquid to the inlet hole; and
    a dividing wall that divides the downstream buffer chamber from the upstream buffer chamber,
    and wherein the sensor positioning member and the sensor positioning member mounting portion do not contact one another in sections other than the dividing wall.

2. The liquid sensing device in accordance with claim 1, wherein the liquid sensing device is installed on a liquid container storing the liquid.

3. The liquid sensing device in accordance with claim 1, wherein the sensor positioning member mounting portion is formed on a liquid container storing the liquid.

4. A liquid container including the liquid sensing device in accordance with claim 1.

5. A liquid sensing device for use in a liquid consuming system in which air is introduced from an upstream end of the system in association with consumption of liquid at a downstream end of the system, the liquid sensing device comprising:
- a sensor positioning member that defines a sensing flow channel including an inlet hole at an upstream end of the sensing flow channel and a first outlet hole at a downstream end of the sensing flow channel;
- a sensor positioned on an outside face of the sensor positioning member at a location facing the sensing flow channel to sense whether the liquid is present in the sensing flow channel; and
- a sensor positioning member mounting portion that mounts the sensor positioning member,
- wherein the sensor positioning member mounting portion includes:
- a downstream buffer chamber-defining portion that includes an aperture communicating
- with the first outlet hole and that in conjunction with the sensor positioning member defines a
- downstream buffer chamber adapted to receive the liquid and the air exiting from the first outlet
- hole; and
- a second outlet hole communicating with the downstream buffer chamber and through which the liquid and the air from the downstream buffer chamber exit,
- and wherein the downstream buffer chamber fulfills the relationship 0.5 N<M<2.5 N,
- where M represents a length of the buffer chamber flow channel in a direction approximately orthogonal to a flow direction of the liquid and the air introduced from the first outlet hole through the buffer chamber flow channel to the second outlet hole;
- and N represents the length of the first outlet hole in a direction approximately orthogonal to the flow direction through the first outlet hole.

6. The liquid sensing device in accordance with claim 5, wherein
the length M is a width along an outside face of the sensor positioning member on the sensor positioning member mounting portion side.

7. The liquid sensing device in accordance with claim 5, wherein
the length M is a width in a direction orthogonal to an outside face of the sensor positioning member on the sensor positioning member mounting portion side.

8. The liquid sensing device in accordance with claim 5, wherein
the first outlet hole includes round tubular shape; and
the length N is a inside diameter of the first outlet hole.

9. A liquid sensing device comprising:
- a sensor chip that has a sensor cavity for receiving a liquid targeted for sensing and that includes a piezoelectric element for imparting oscillation to the sensor cavity;
- a sensor base that is joined to the sensor cavity side of the sensor chip;
- a first hole provided in the sensor base and adapted to conduct the liquid into the sensor cavity;
- a second hole provided in the sensor base and adapted to drain the liquid from the sensor cavity;
- a downstream buffer chamber for retaining liquid drained from the second hole;
- an outlet for liquid provided to the downstream buffer chamber; and
- a bypass circuit-defining part that defines a bypass circuit for bypassing the flow channel inside the downstream buffer chamber leading from the second hole towards the outlet,
- wherein the bypass circuit-defining part has a first wall for inhibiting flow in a straight-line path from the second hole to the outlet of the downstream buffer chamber.

10. The liquid sensing device in accordance with claim 9 wherein
the bypass circuit-defining part has a second wall that defines the bypass circuit in the substantially opposite direction from the direction leading from the second hole to the outlet of the downstream buffer chamber.

11. A liquid sensing device comprising:
- a sensor chip that has a sensor cavity for receiving a liquid targeted for sensing and that includes a piezoelectric element for imparting oscillation to the sensor cavity;
- a sensor base that is joined to the sensor cavity side of the sensor chip;
- a first hole provided in the sensor base and adapted to conduct the liquid into the sensor cavity;
- a second hole provided in the sensor base and adapted to drain the liquid from the sensor cavity;
- a downstream buffer chamber for retaining liquid drained from the second hole;
- an outlet for liquid provided to the downstream buffer chamber;
- a bypass circuit-defining part that defines a bypass circuit for bypassing the flow channel inside the downstream buffer chamber leading from the second hole towards the outlet;
- an upstream buffer chamber for retaining liquid to be conducted to the first hole; and
- a partition wall that partitions the upstream buffer chamber from the downstream buffer chamber,
- wherein the upstream buffer chamber and the downstream buffer chamber have flow channel walls at locations facing the sensor base; and
- the partition wall and the bypass circuit-defining part are constituted by ribs integrally formed with the flow channel walls and extending towards the sensor base.

12. The liquid sensing device in accordance with claim 11, wherein
the partition wall does not contact the sensor base; and
rib height from the flow channel wall to the distal edge of the bypass circuit-defining part is equal to or shorter than the rib height from the flow channel wall to the distal edge of the dividing wall.

13. The liquid sensing device in accordance with claim 12, wherein
flow channel resistance in the gap between the sensor base and the bypass circuit-defining part is higher than flow channel resistance in the bypass circuit.

14. The liquid sensing device in accordance with claim 11, wherein
the device has a main case in which the upper buffer chamber and the lower buffer chamber are formed; and the main case constitutes part of the receptacle for storing the liquid.

15. A liquid container furnished with the liquid sensing device in accordance with claims 9.

* * * * *